(No Model.)

H. H. BROWN.
SAD IRON HEATER.

No. 269,510. Patented Dec. 26, 1882.

Witnesses:
P. B. Turpin,
T. N. Griffin

Inventor
Harrison H. Brown
By R. S. & A. P. Lacey
Att'ys

UNITED STATES PATENT OFFICE.

HARRISON H. BROWN, OF LADOGA, WISCONSIN.

SAD-IRON HEATER.

SPECIFICATION forming part of Letters Patent No. 269,510, dated December 26, 1882.

Application filed May 25, 1882. (No model.)

*To all whom it may concern:*

Be it known that I, HARRISON H. BROWN, a citizen of the United States, residing at Ladoga, in the county of Fond du Lac and State of Wisconsin, have invented certain new and useful Improvements in Sad-Iron Heaters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in sad iron heaters; and it consists in the peculiar arrangement of the lid and the lever for raising it, and in the manner of constructing the lid so it may be used for a sad-iron heater, or as a meat-roaster, or culinary heater, as may be desired.

Figure 1:
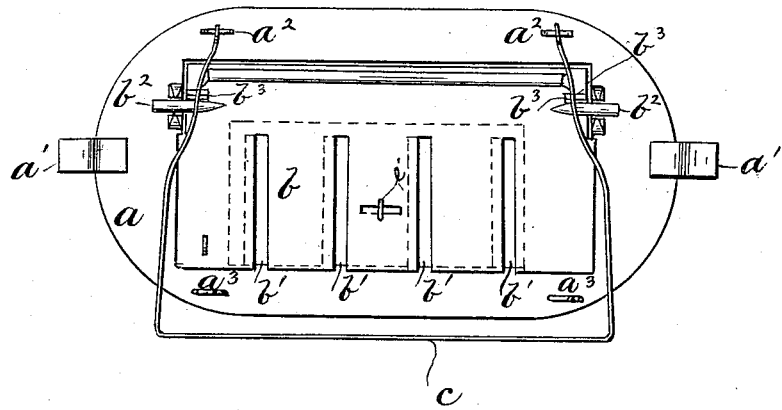
Figure 2:
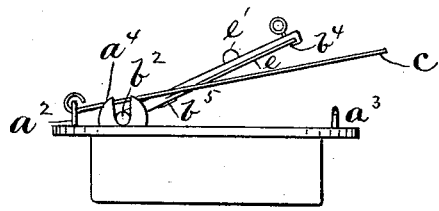
Figure 3:
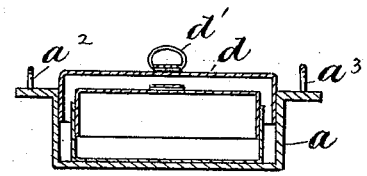
Figure 4:
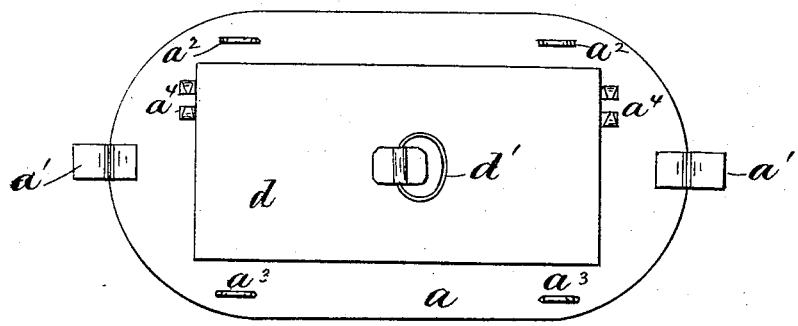

In the drawings, Figure 1 is a plan, and Fig. 2 is a side view, of a sad-iron heater constructed according to my invention; and Fig. 3 is a cross-section, and Fig. 4 is a plan, of a heater with solid lid.

$a$ is the heater, of ordinary form.

$a'\,a'$ are handles by which the heater may be raised.

$a^2\,a^2$ are ears placed on the heater, in which are hooked the ends of the bail-lever $c$ for raising the lid.

$a^3\,a^3$ are ears placed on the heater opposite the ears $a^2\,a^2$, and in which may be hooked the ends of a supplementary bail, to be used in connection with the bail-lever for raising the heater.

$a^4\,a^4$ are bearings for the gudgeons of the lid, as will be hereinafter more fully described.

$b$ is the lid. It is constructed with slots $b'$, up through which the handles of the iron project, and it is so hinged that it can be only partially raised when the bail $c$ is in position, as shown in Fig. 2. The rear of the lid is cut away, so as to rest between the bearings $a^4$, while the forward part is left wide enough to rest over the edges of the well of the heater.

$b^2\,b^2$ are gudgeons fixed to the lid and resting in the bearings $a^4\,a^4$. The lid $b$ is extended to the rear beyond these gudgeons $b^2\,b^2$, as shown.

$b^3\,b^3$ are lugs placed on either side on the lid in rear of the gudgeons $b^2$, and serve as bearings for the bail-lever, as will be hereinafter described.

$c$ is the bail-lever. Its ends are looped in the ears $a^2\,a^2$, and it is extended forward, rests on the lugs $b^3$, and is bent outward, as shown, so that the front end of the lid may pass up above the front of the bail and its sides will engage the lid about midway between the front and rear, so the lid can be only partially raised, as shown.

$d$ is a solid lid, having handle $d'$, and it is adapted to fit the top of the well and furnish a close top when it is desired to cook or heat meat or other articles. The meat or other articles may be placed in a pan, as shown in Fig. 3, down in the well of the heater, and covered by the close lid $d$, as shown. When this close lid is desired to be used the lid $b$ is removed.

$e$ is a slide placed on the under side of the lid $b$, and having the handle $e'$ passed up through and operating in an elongated slot in the lid $b$. The slide $e$ is held to the lid $b$ by flange $b^4$, extending down from the front end of the lid under the slide, and by suitable ways $b^5$, fixed to the under side of the lid, as shown in Fig. 2. The slide $e$ has slots corresponding to the slots in lid $b$, and the slide is so arranged that the slots may be brought under the slots in lid $b$, and thus form a slotted top; or the solid portions of the slide may be brought under the slots in the lid $b$, and thus form a close top and obviate the necessity of the additional close lid $d$. It will be understood the lid $b$ can be made with or without the slide $e$, as is desired. The slide in the lid is also advantageous when irons with removable handles are used, as the close receptacle will heat the irons in shorter time than if the slots $b'$ were to remain open.

The operation of this device is simple, and, by reference to the drawings, easily understood. The irons are set down on the bail $c$, which, by its bearing on the lugs $b^3$, raises the lid, as shown in Fig. 2. The irons are then slipped into the well of the heater, the handles projecting up through the slots $b'$, and, the weight being removed from the bail-lever, the lid falls to its original position. In case irons with removable handles are used, when the irons are placed in the well of the heater the handles project through the slots $b'$. The handles are then removed and the slide $e$ is moved over, so as to form a solid lid for the heater.

Having thus described my invention, what I claim, and desire to secure by Letters Patent, is—

1. In a sad-iron heater, the combination, with the lid $b$, having its rear portion extended beyond the points of bearing with the heater, and having the lugs $b^3$ placed on it in the rear of its bearing with the heater, of the bail-lever $c$, looped in ears on the heater in rear of the lid $b$ and extended forward, resting on the lugs $b^3$, and flared outward, so as to clear the front end of the lid, substantially as set forth.

2. In a sad-iron heater, the combination, substantially as hereinbefore set forth, of the base $a$, having a heating-chamber to receive the irons, a lid or cover hinged to the base and dropping automatically over and covering the heating-chamber, and provided with slots open at their outer ends to receive the handles of the irons, and a slide placed on the under side of the lid, and provided with a series of slots open at their outer ends and coinciding with the slots in the lid, and mechanism whereby the slide may be moved laterally for the purpose of opening or closing the slots in the lid, substantially as set forth.

In testimony whereof I affix my signature in presence of two witnesses.

HARRISON H. BROWN.

Witnesses:
H. A. HOWARD,
N. C. GRIFFIN.